United States Patent
Russ

(10) Patent No.: US 6,219,624 B1
(45) Date of Patent: Apr. 17, 2001

(54) SYNCHRONOUS TIMER VEHICLE SPEED MEASUREMENT

(75) Inventor: Ronald Paul Russ, Farmington Hills, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/128,604

(22) Filed: Aug. 3, 1998

(51) Int. Cl.[7] .............................. G01P 3/00; G01R 23/02
(52) U.S. Cl. ............................................. 702/75; 702/147
(58) Field of Search ................................ 702/75, 96, 147, 702/148; 701/74, 75; 327/24, 26, 31

(56) References Cited

U.S. PATENT DOCUMENTS

| | | |
|---|---|---|
| 4,151,466 | 4/1979 | Boyer et al. . |
| 4,485,452 | 11/1984 | Cording et al. . |
| 4,539,642 * | 9/1985 | Mizuno et al. ................... 364/426 |
| 4,584,528 | 4/1986 | Ohmae et al. . |
| 4,718,013 * | 1/1988 | Kubo .................................. 364/426 |
| 4,738,492 * | 4/1988 | Matsuda ............................. 303/106 |
| 4,807,101 * | 2/1989 | Milde, Jr. .......................... 362/276 |
| 4,839,834 | 6/1989 | Omae et al. . |
| 4,953,095 * | 8/1990 | Ishikawa et al. .................. 364/484 |
| 4,992,730 | 2/1991 | Hagiya . |
| 5,017,861 | 5/1991 | Hukuda . |
| 5,138,639 | 8/1992 | Nakamura . |
| 5,168,220 | 12/1992 | Min . |
| 5,315,536 | 5/1994 | Murase et al. . |
| 5,357,196 * | 10/1994 | Ito ...................................... 324/166 |
| 5,357,451 | 10/1994 | Beaudry et al. . |
| 5,404,304 * | 4/1995 | Wise et al. ..................... 364/426.04 |
| 5,448,163 | 9/1995 | Murase . |
| 5,644,288 * | 7/1997 | Kuroyanagi ...................... 340/441 |

* cited by examiner

Primary Examiner—Patrick Assouad
(74) Attorney, Agent, or Firm—Mark L. Mollon

(57) ABSTRACT

A method of measuring the period of a vehicle speed signal is disclosed that includes the steps of accumulating predetermined time interval increments between first and second rising edges of the signal, calculating a remainder time interval upon detection of the second edge of the signal and adding the remainder to the accumulated increments value to obtain the period, and calculating an average period from a plurality of consecutive period measurements. If the accumulated value exceeds a predetermined maximum value before the second edge occurs, the maximum value is used in calculating the average.

7 Claims, 3 Drawing Sheets

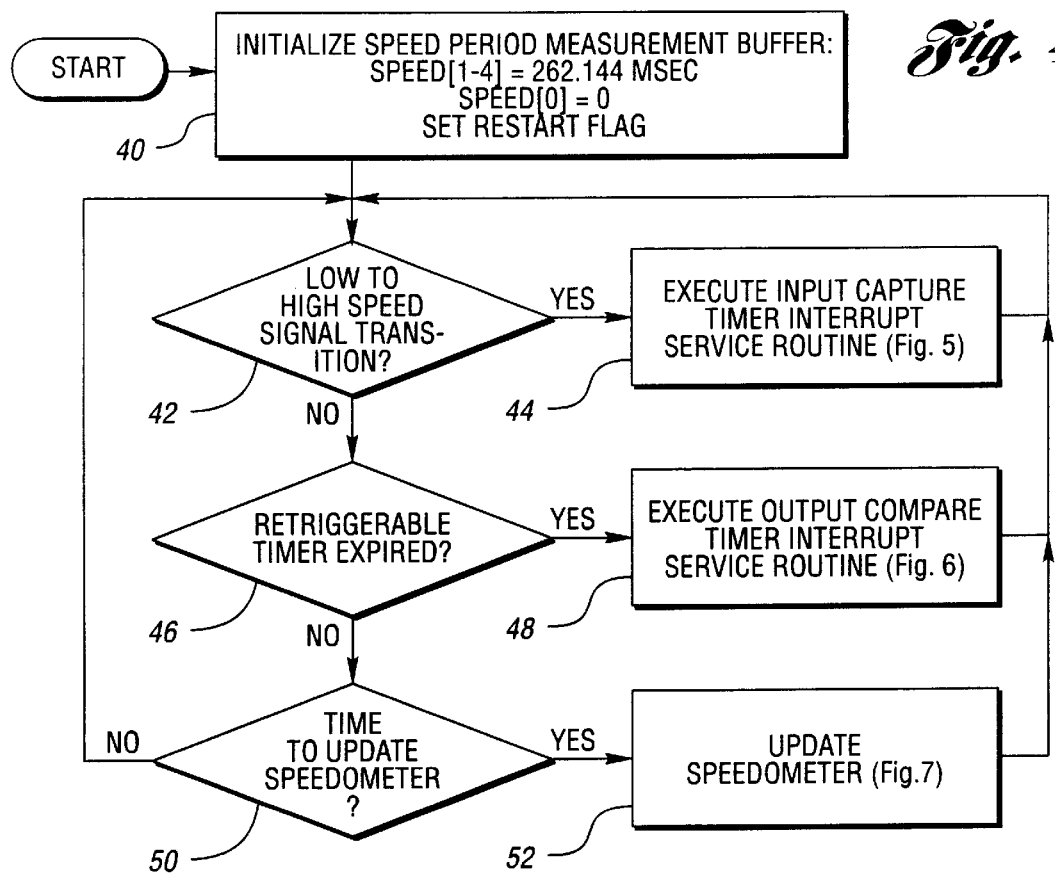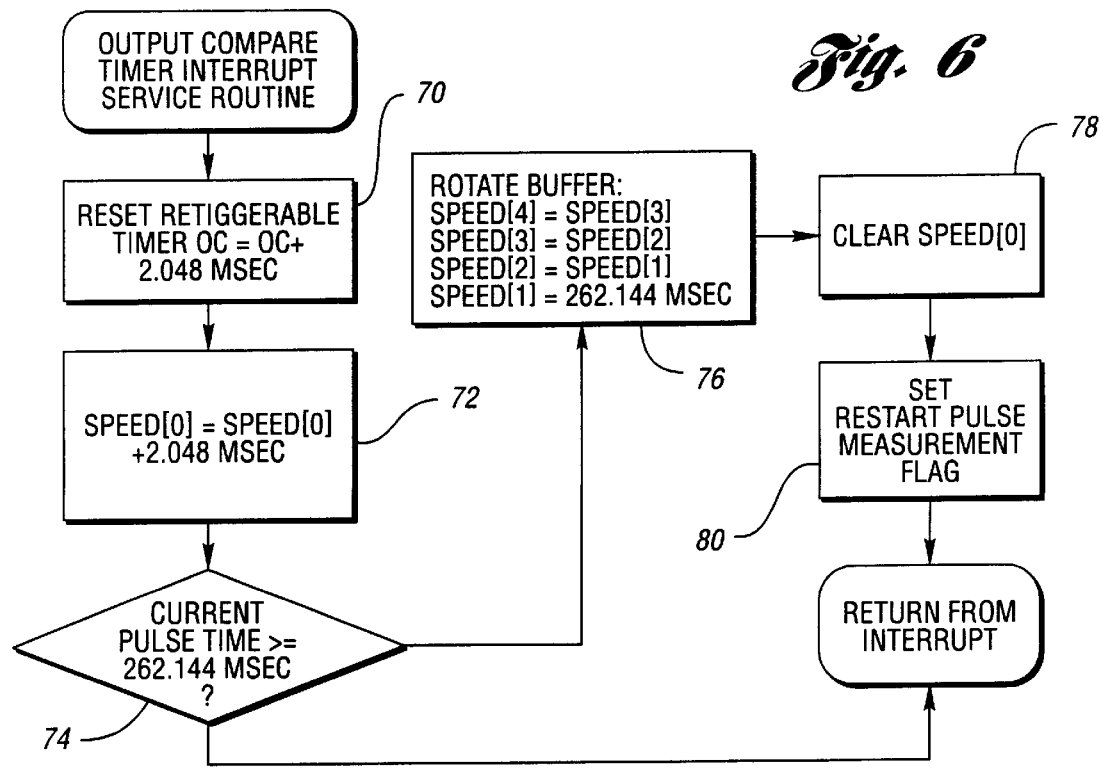

SYNCHRONOUS TIMER VEHICLE SPEED MEASUREMENT

TECHNICAL FIELD

This invention relates to vehicle speed measurement and, more particularly, to a method of vehicle speed measurement that provides an improved response to slow speeds and loss of speed signal.

BACKGROUND OF THE INVENTION

Instrument clusters used in automobiles commonly use microprocessors to measure the vehicle speed signal and display the speed on an air-core gauge. Two common measurement techniques are used in the prior art. One, a pulse period measurement technique uses a high-resolution timer to store the time when each speed pulse edge occurs. The pulse period is the difference in 2 consecutive values. The high-resolution timer typical in current instrument clusters are 16-bits with a 2 microsecond resolution. The maximum period that can be measured without considering overflows is:

Max Period=$10000*2 usec=131.072 milliseconds

If overflows are considered, then the period is a relationship between the time difference and the number of overflows accumulated. An overflow is a count of how many times the timer has overflowed from $FFFF to $0000. Using an overflow counter allows longer pulse periods to be measured. Pulse period measurement has the advantages of high measurement accuracy and fast response, but exhibits a "steppy" response at low speeds and a perceived pause upon signal loss.

A second measurement technique counts the number of pulses per time interval. A timer provides a time base for counting speed pulses. Each speed pulse count is placed into a finite length buffer and periodically summed yielding a frequency. This frequency is then converted to vehicle speed. While this technique produces a smooth response over the entire range, the resolution of this method requires extensive filtering to achieve acceptable values, severely affecting the response.

SUMMARY OF THE INVENTION

The present invention combines the benefits of both the aforementioned methods while eliminating the disadvantages. The present invention provides accurate speed measurement, fast response, improved low speed response, and quick response to loss of signal. According to the present invention an input capture timer interrupt responds to the rising edge of the speed signal and is used to synchronize an output compare timer interrupt that is scheduled to occur at a fixed time interval (every 2.048 milliseconds). Each time an input capture interrupt occurs a new measurement period is started. Each time the output compare interrupt occurs, a time of 2.048 milliseconds is added to a current speed period value. On the next speed signal interrupt, the difference between the captured time and the time that the last output compare interrupt occurred is calculated. This difference is then added to the current speed period value to obtain the period measurement. Each period measurement is input to a multistage speed buffer. If the period measurement reaches a threshold then a maximum period value is input to the buffer. The speed buffer is updated using the 2.048 millisecond interrupt and prevents the long delays associated with using timer overflows. The filtering used to calculate the speed is therefore not executing on 'static' data. This prevents the pause or hitch seen in the prior art pulse period measurement techniques when the signal is removed.

BRIEF DESCRIPTION OF THE DRAWINGS

A more complete understanding of the present invention may be had from the following detailed description which should be read in conjunction with the drawings in which:

FIG. 4 is an overall flowchart of the invention;

FIG. 6 is a detailed flowchart of the output compare timer interrupt service routine;

DETAILED DESCRIPTION OF PREFERRED EMBODIMENT

Figure 1:
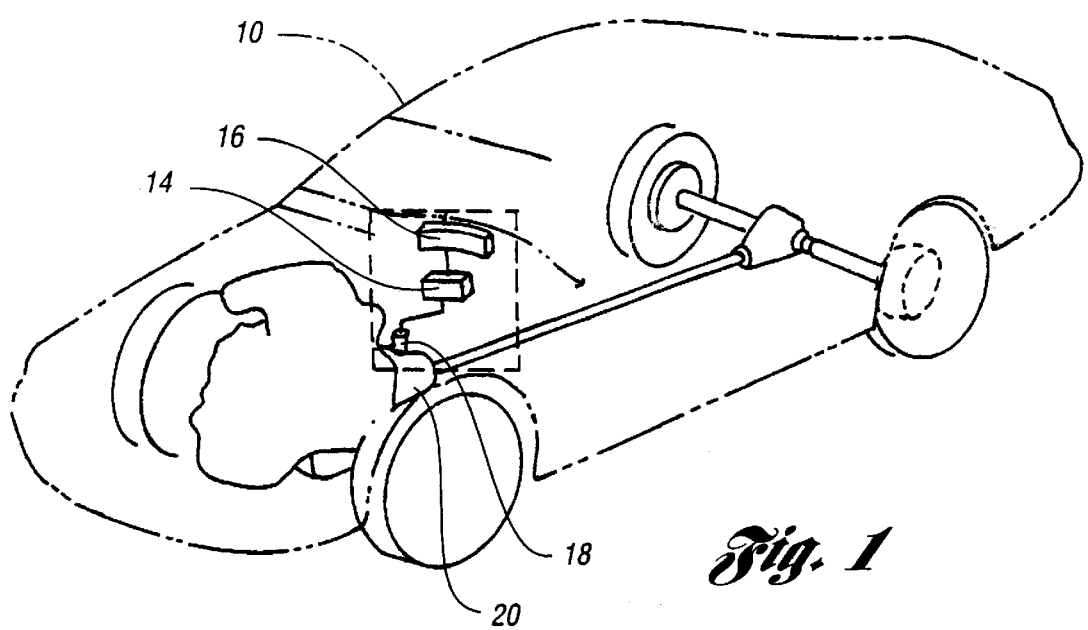
FIG. 1 shows the vehicle environment in which the present invention is used.
Figure 2:
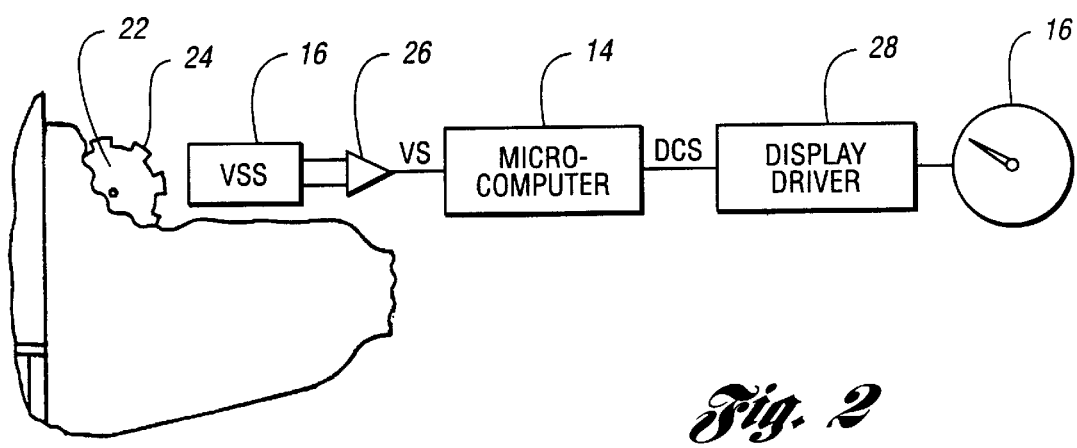
FIG. 2 is a block diagram of the invention.

Referring now to the drawings and initially to FIG. 1, a vehicle indicated at 10 includes a speed measurement system generally designated 12. The system 12 includes a microcomputer 14 that controls a speed display 16 in response to a signal VS from a speed sensor 18 magnetically coupled to the vehicle transmission 20. As shown in FIG. 2, multi-toothed gear 22 is driven by transmission 20 and rotates at a speed directly related to vehicle speed. The gap between vehicle speed sensor 18 and gear 22 increases and decreases as each tooth 22 passes by sensor 18. This rotation generates an electric current in the speed sensor which is filtered and buffered in a conventional manner by input signal conditioning circuitry 26 to produce speed signal VS, a periodic signal having a period that is inversely related to the speed of the vehicle. Microcomputer 14 generates a display control signal DCS responsive to VS for displaying the vehicle speed on display 16. The display 16 is preferably an air-core meter driven by air-core meter driver 28, such as Signetics Linear Products SA5775, that interfaces with microcomputer 14 through a serial bus.

Figure 3:
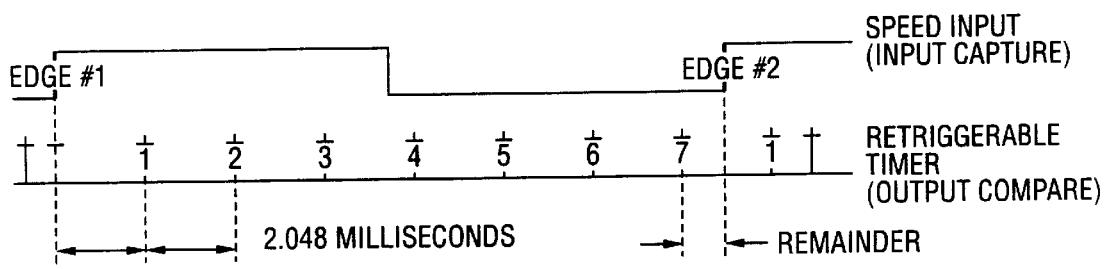
FIG. 3 shows a waveform helpful in understanding the measurement method of the present invention.

The speed input period is the time interval between two successive positive edges of the signal VS. These edges are shown as Edge #1 and Edge #2 in FIG. 3. In the microcomputer 14, a 16 bit free running timer, that is incremented every 2 microseconds, is used as a time base to capture the time of Edge #1 and Edge #2. Each edge starts a new speed measurement period and initiate an input capture routine that captures and stores the time of the edge as a first variable SPD and resets a 2.048 msec retriggerable timer. Each time the retriggerable timer expires an output compare routine is executed that adds 2.048 msec to a current speed measurement period Speed [0] and stores the time of the last output compare interrupt as a second variable SPD2. The running time measurement of the current pulse is checked for long pulse widths or no signal. Edge #2 ends the measurement of the current pulse width or period. Vehicle speed is inversely related to the period.

Vehicle Speed (mph)=3600 seconds/(Pulses Per Mile*Speed Input Period)

The pulse width or period is calculated as:

Pulse Width=Speed [0]+Remainder

When Edge #2 occurs the free running timer value is captured and the remainder is calculated as:

Remainder=SPD−SPD2

Referring now to FIG. 4, a flowchart of the speed measurement routine is shown. At block 40, all registers used for speed period measurement are initialized and a restart measurement period flag is set. The speed signal VS is checked at block 42 for a rising edge and upon detection thereof, an input capture interrupt routine is executed as indicated at block 44 and described in detail in FIG. 5. This routine stores the time value SPD in computer memory. The time stored is the value of a high resolution 16 bit free running timer when the edge occurred. This routine also resets a retriggerable timer, keeps track of the time since the last edge, and calculates the remainder when necessary. Between rising edges of the speed signal, the expiration of the retriggerable timer is checked at block 46. If the timer has expired an output compare timer interrupt service routine is executed at block 48 that resets a pulse measurement period restart flag if the accumulated time since the last edge exceeds a maximum period as will be discussed in connection with FIG. 6. If the retriggerable timer has not expired a check is made at block 50 to determine if it is time to update the speed display and if so this routine is performed at block 52 as will be further discussed in connection with FIG. 7. Otherwise, and in any event after display update, the monitoring of the speed signal for a rising edge continues at block 42.

Figure 5:
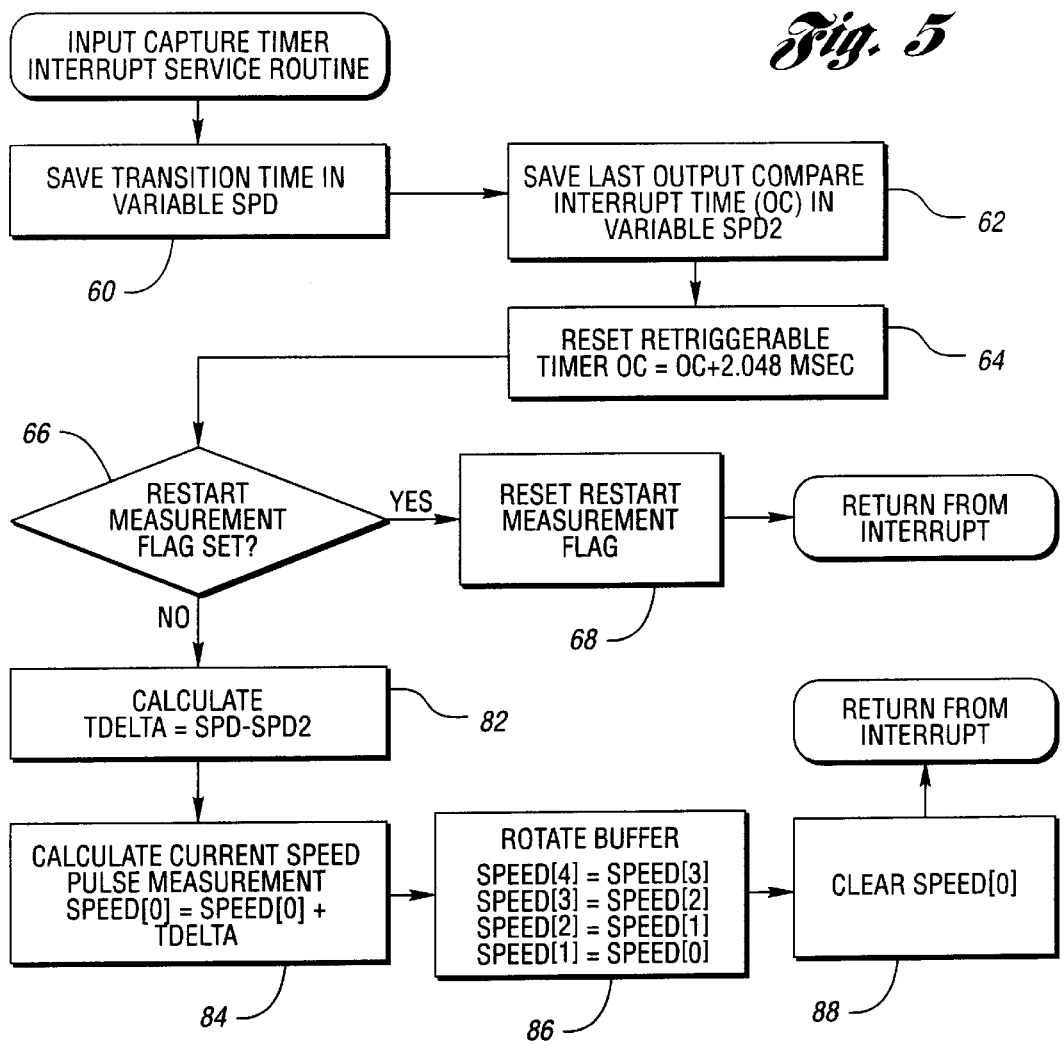
FIG. 5 is a detailed flowchart of the input capture interrupt service routine.

Referring now to FIG. 5, a flowchart of the input capture interrupt routine is shown. The time of the occurrence of a rising edge of the speed signal is captured at block 60, by reading the value SPD of the free running timer and storing the value in computer memory. At block 62, the time of the free running timer OC that corresponds to the last output compare interrupt occurred is stored in computer memory as SPD2 for use in calculating the remainder shown in FIG. 3. At block 64, the 2.048 millisecond retriggerable timer is reset and OC is incremented by 2.048 msec. At block 66, the restart measurement period flag is checked. If the flag is set, as is the case the first time through this loop, the flag is reset at block 68. Each time the retriggerable timer interval expires as mentioned in connection with FIG. 3, the output compare routine of FIG. 6 is executed as indicated in block 48.

Referring now to FIG. 6, the output compare timer interrupt service routine, when entered, resets the retriggerable timer, at block 70, and increases the value of OC by 2.048 msec. At block 72, a current speed period measurement register SPEED[0], is incremented by 2.084 msec. If SPEED[0] is >=a predetermined maximum speed period, i.e., indicative of a below minimum vehicle speed, as determined by block 74, then a value of 262.144 msec, corresponding to that speed, is entered in buffer register SPEED[1] as indicated in block 76. SPEED[0] is then cleared at block 78 and the restart pulse measurement flag is set at block 80. Otherwise, if the current pulse measurement is less that the maximum speed period, the program falls though the loop formed by the blocks 42, 46 and 50 until the retriggerable timer expires as detected at block 46. At that point, the output compare timer routine is called to increment register SPEED[0] by 2.048 msec. This incrementing of SPEED[0] continues until the time exceeds 262.144 or a rising edge is detected at block 42. When a rising edge is detected, the service routine of FIG. 5 is reentered and since the restart measurement flag is reset, the decision made at block 66 calls for the calculation of the remainder or difference between the time of the rising edge SPD and the time of the last output compare interrupt SPD2 as indicated in block 82. This difference is then added to the value in SPEED[0] at block 84 and the sum is shifted into register SPEED[1] causing the oldest speed pulse measurement to be shifted out of the buffer as indicated in block 86. The SPEED[0] register is then cleared at block 88 to prepare for the next pulse measurement period.

Figure 7:
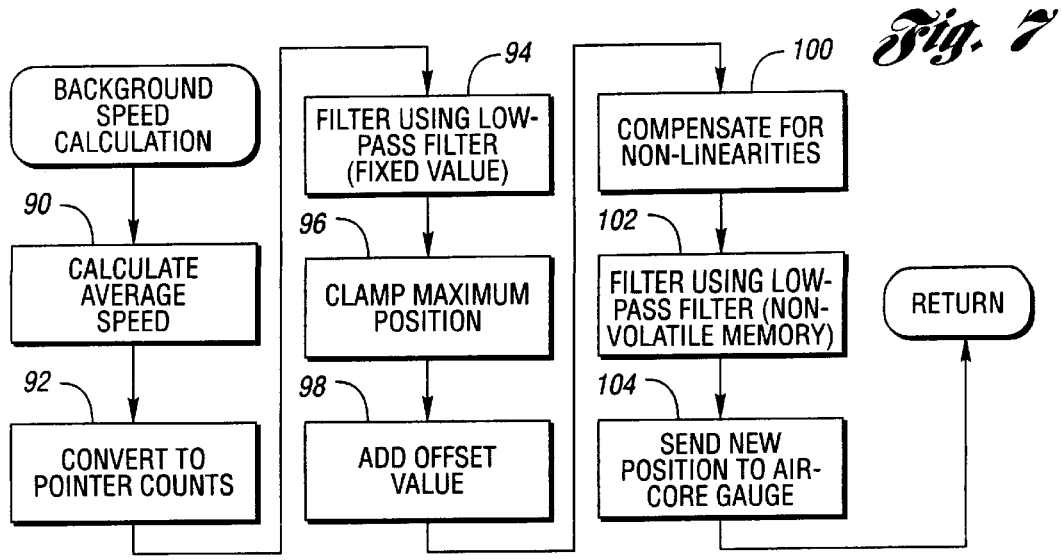
FIG. 7 is a flowchart of the background speed calculation using the speed measurement method of the present invention to drive an air core gauge.

Vehicle speed is calculated using a background task and is normally scheduled at predetermined intervals which may be between 25 to 50 milliseconds depending on the application. When the predetermined interval has passed as determined by block 50, the speed update routine of FIG. 7 is entered. All values in the speed buffer are summed at block 90 and an average speed value is obtained from the sum. At block 92, this average value is converted to a pointer count value suitable for display on an air-core gauge, using a linear approximation approach. The pointer count value is low pass filtered at block 94 and clamped at a maximum display position at block 96. An offset value is added at block 98 to compensate for manufacturing errors and non-linearities in the gauge are compensated for in block 100. At block 102 the value is low pass filtered and sent to the air core gauge as indicated in block 104.

While the best mode for carrying out the present invention has been described in detail, those familiar with the art to which this invention relates will recognize various alternative designs and embodiments for practicing the invention as defined by the following claims.

What is claimed is:

1. A method of measuring the period of a signal comprising a sequence of the following steps:
   detecting a first edge of said signal;
   accumulating predetermined time interval increments between edges of the signal;
   if the current value of the accumulated increments is equal to or greater than a predetermined maximum value, terminating the period measurement and storing said maximum value as the period measurement value;
   if said current value is less than said predetermined maximum value, calculating a remainder time interval upon detection of a second edge of said signal and modifying said current value to account for the calculated remainder and storing modified current value as the period measurement value; and
   calculating an average period from a plurality of consecutive period measurement values.

2. The method of claim 1 wherein the value of a free running timer is stored upon detection of a signal edge;
   said increments are generated by a retriggerable timer that is triggered upon detection of a signal edge; and
   said period measurement values are stored in an N stage FiFo buffer for use in the average calculation.

3. The method of claim 1 wherein period measurement starts with said first edge by setting a retriggerable timer to generate interrupts at the end of a predetermined time interval, a current speed value is increased by said time interval each time said interrupt is generated and period measurement ends with said second edge or when said current speed value exceed a predetermined maximum value.

4. The method of claim 3 wherein a free running counter is used to identify the times of said edges and the occurrence of the interrupt preceeding an edge in order to calculate a remainder value to be added to said current speed value to determine the period of the signal.

5. The method of claim 4 wherein said signal is a vehicle speed signal and the value of the average period is used to drive a speed display.

6. A method of measuring and displaying vehicle speed based on the period of a vehicle speed signal comprising a sequence of the following steps:

executing an input capture routine upon detection of a first transition in said speed signal to initiate the determination of a current speed period value;

executing an output compare routine upon each expiration of a predetermined time interval following said detection of a transition in said speed signal;

executing a speedometer update routine after a plurality of said periods;

said capture routine accumulating predetermined time interval increments between transitions of the speed signal and adding a calculated remainder time interval equal to the difference in time between execution of said capture routine and the previous execution of said compare routine to obtain said current speed period value and storing said current value;

if the accumulated increments equal or exceed a predetermined maximum value prior to detection of a second transition, terminating the period measurement and storing said maximum value;

calculating an average period from a plurality of values stored.

7. Apparatus for measuring and displaying vehicle speed based on the period of a vehicle speed signal comprising:

detecting means for detecting a first transition in said speed signal to initiate the determination of a current speed period value;

calculating means for accumulating predetermined time interval increments subsequent to said first transition and prior to a second transition of the speed signal;

memory means for storing a maximum current period if the accumulated increments exceed a maximum period;

said calculating means calculating any remainder time interval upon the detection of said second transition between the time of the second transition and expiration of the previous time increment;

said calculating means adding said remainder time interval to said accumulated increments and storing the sum as a current period in said memory means;

means for calculating an average period from a plurality of the most recent periods stored.

* * * * *